US012208961B1

(12) United States Patent
Haas

(10) Patent No.: US 12,208,961 B1
(45) Date of Patent: Jan. 28, 2025

(54) CONFIGURABLE WASTE RECEPTACLE HOOD AND GUARD PLATE ASSEMBLY

(71) Applicant: Kettle Creek Corporation, Ottsville, PA (US)

(72) Inventor: Benjamin S. Haas, Ottsville, PA (US)

(73) Assignee: Kettle Creek Corporation, Ottsville, PA (US)

( * ) Notice: Subject to any disclaimer, the term of this patent is extended or adjusted under 35 U.S.C. 154(b) by 0 days.

(21) Appl. No.: 18/155,568

(22) Filed: Jan. 17, 2023

Related U.S. Application Data

(60) Provisional application No. 63/299,529, filed on Jan. 14, 2022.

(51) Int. Cl.
*B65F 1/16* (2006.01)

(52) U.S. Cl.
CPC .... *B65F 1/1607* (2013.01); *B65F 2001/1653* (2013.01)

(58) Field of Classification Search
CPC ....................... B65F 1/1607; B65F 2001/1653
USPC ............................................... 220/908, 908.3
See application file for complete search history.

(56) References Cited

U.S. PATENT DOCUMENTS 2,214,968 A * 9/1940 Macmillen ............ H02G 3/125 220/3.9
3,627,399 A * 12/1971 Addison ........... B65D 81/3827 312/351
3,793,756 A * 2/1974 Kay ........................ G09F 23/00 D34/1
4,700,849 A * 10/1987 Wagner .................. A47B 81/04 211/74
4,905,853 A * 3/1990 Strawder ............... B65F 1/1607 220/523

(Continued)

FOREIGN PATENT DOCUMENTS

CN 107857014 A 3/2018
DE 202014102080 U1 12/2014

(Continued)

*Primary Examiner* — James N Smalley
(74) *Attorney, Agent, or Firm* — Wilkinson Law Office; Clinton H. Wilkinson

(57) ABSTRACT

An in-field configurable hood and guard plate assembly for waste receptacle. The waste receptable is provided with a lid having a cutout opening through which waste can be deposited into the waste receptacle. A plurality of mounting holes are provided in the lid and arranged in a standard bolt pattern around a periphery of the cutout opening. One or more customizable attachments including in-field installable hoods and guard plates of varying configurations are attached to the lid to meet the user's requirements for both precipitation protection and modifiable openings for waste discrimination. The attachments have mounting holes positioned and designed to correspond to the standard bolt pattern on the waste receptacle lid, which enables the receptacle owner to reconfigure the hood and guard plate assembly in a variety of ways in-field using pre-fabricated parts that do not require modification of the waste receptacle lid itself, allowing the user using standard handheld tools and fasteners to add or remove a rain hood; change the opening in the lid or hood, or add or omit, features without purchasing a new lid, or waste receptacle, saving both time and cost.

22 Claims, 6 Drawing Sheets

(56) References Cited

U.S. PATENT DOCUMENTS

| | | | | |
|---|---|---|---|---|
| D312,523 | S | | 11/1990 | Delmerico et al. |
| 5,706,971 | A | * | 1/1998 | Taylor .................. B65F 1/1607 220/523 |
| D391,728 | S | | 3/1998 | Delmerico |
| 5,967,355 | A | | 10/1999 | Ragot |
| D487,538 | S | | 3/2004 | Skalka |
| D487,539 | S | | 3/2004 | Moroney |
| D543,331 | S | | 5/2007 | Jackson et al. |
| D551,414 | S | | 9/2007 | Weiss |
| D557,868 | S | | 12/2007 | Skalka |
| D584,872 | S | | 1/2009 | Fankhauser |
| D610,322 | S | | 2/2010 | Schwartz et al. |
| D643,987 | S | | 8/2011 | Soto et al. |
| 8,844,741 | B2 | | 9/2014 | Perelli et al. |
| D734,583 | S | | 7/2015 | Gerard |
| D754,411 | S | | 4/2016 | Paz |
| D805,707 | S | | 12/2017 | Kopp et al. |
| D805,708 | S | | 12/2017 | Kopp et al. |
| D871,706 | S | | 12/2019 | Dobson |
| 2015/0291328 | A1 | | 10/2015 | Blin |
| 2015/0336739 | A1 | | 11/2015 | Presnell et al. |
| 2016/0311615 | A1 | | 10/2016 | Fahrenkrug |

FOREIGN PATENT DOCUMENTS

| | | | |
|---|---|---|---|
| EP | 3056452 | B1 | 8/2017 |
| GB | 2426692 | A | 12/2006 |

* cited by examiner

CONFIGURABLE WASTE RECEPTACLE HOOD AND GUARD PLATE ASSEMBLY

CROSS-REFERENCE TO RELATED APPLICATION

This application claims priority benefit of U.S. Provisional patent application Ser. No. 63/299,529, filed on Jan. 14, 2022, the entire disclosure of which is hereby incorporated herein by reference.

FIELD OF THE INVENTION

The present invention relates to the field of receptacles for waste collection, and more particularly to hood and guard plate assembly configurations for waste receptacles.

BACKGROUND OF THE INVENTION

Often, a waste receptacle-such as a cylindrical 'trash can' that one may find in a park-will be of a standard design having a flat plate as a lid and a specific-shaped hole cut into the lid forming a fixed opening through which only waste less than a certain size or of certain dimensions can be deposited through. Throughout this specification, the term "waste receptacle" is intended to refer to a receptacle or container for holding discarded objects (such as trash or garbage), recycling (such as cans, paper, and other objects to be recycled), as well as other items that are no longer of use and/or which may be refurbished or reused. When fielding a waste receptacle for public or outdoor settings, it is often desirable to shield the interior of the receptacle from ingressing precipitation and, at the same time, restrict the opening through which waste is placed in the receptacle to control the type of waste deposited in the receptacle. In one solution a raised hood may be installed extending over the opening in the lid to prevent rain and snow from falling through the lid opening into the receptacle. At the same time, one or more side openings which may be size restricted are formed between the hood and the top surface of the lid through which access to the lid opening is provided, which access cannot be substantially obstructed by the hood.

Both the receptacle lid and hood are typically of fixed designs, both being unable to be modified after initial manufacturing. As a result, the dimensions and position of both the opening in the lid and opening under the hood providing access to the lid opening are fixed. This introduces particular problems for the waste receptacle owner. One such problem is that if the opening in the fixed design lid is determined to be inadequate in size, shape, position, dimensions etc., or the owner wants it changed in the field, it cannot be changed to a different opening without either buying a new waste receptacle or manufacturing a new lid. A related problem is that if the hood that comes with the lid is designed for the opening to be changed, it may not be possible to modify the hood to conform to the new opening.

Modifying the Lid Opening In-Field. Many waste receptacles are built with the lid physically secured to the container structure of the receptacle so the lid cannot be removed by vandals or animals, while other lids are removable but are connected to the container structure via a cable or other connector. Most all lids are fabricated using any combination of welding, metal spinning, drawing, or other suitable manufacturing techniques. In most all cases, the lid itself cannot be modified without requiring substantial rework, especially if the lid is permanently attached to the receptacle structure. In the case of a lid structure having a fixed opening for waste, most solutions for changing the shape or dimensions of the opening require the owner to purchase an alternative lid, which adds expense to their project, or to use makeshift alternatives such as gluing add-ons in place over or around the fixed lid opening. While a few lids may have changeable covers or inserts these solutions are generally unreliable, or prone to damage compared to stronger solutions such as welding, fastening, etc.

Waste discrimination is a central part of an effective waste receptacle. While visual solutions such as decals or colored paint are often used to guide a person away from, for example, placing recyclables in a trash receptacle, a back-up strategy is to use a restricted opening to prevent incorrect items from being deposited in that receptacle. Whereas small circular openings may be sized to allow cans for recycling to pass through the opening, they prevent large, box-shaped food containers for trash from being placed in the receptacle. Often what is encountered in waste collection is that either certain openings are found to be better than others in practice, or the waste receptacle user wants to repurpose a receptacle initially intended for trash to recycling, or vice versa, typically due to a change in venue. Lid openings for recycling tend to be small and shaped for their specific items (small circles for cans, slots for paper) while trash requires large, broad openings for the multitude of sizes non-recycling waste can take. This means that a lid opening intended for recycling is not ideal for trash, and a lid opening intended for trash is not ideal for recycling as it permits trash into the recycling stream. In order for the waste receptacle owner to save money, there must be a way for them to either modify their existing lids or acquire lids with modifiable features so they can be changed in-field.

Modifying the Hood Opening In-Field. As indicated above, raised hoods secured to a waste receptacle lid extending above and over the lid opening are often used to inhibit the ingress of precipitation through the lid opening. These hoods must be designed so that the opening in the hood achieves the same waste discrimination as the lid opening and does not impact access to the cutout opening in the lid. Some hoods are simple 'umbrella' designs consisting of a roof supported by thin legs, while others are more complex and ornamental in appearance. For many of these hoods, the shape and dimensions of the hood opening are set and cannot be modified once the hood has been built. However, the situation may arise where the end user wants to maintain the ornamental appearance of the hood but modify the hood opening for a different waste discrimination requirement. In order for the waste receptacle owner to save money without having to buy a new hood, there must be a way for the owner to modify hoods in-field as needed to keep the existing appearance, but to change the shape or dimensions of the lid opening.

SUMMARY OF THE INVENTION

The present invention relates to a system of hood and guard plate attachments for a waste receptacle lid that enable customization thereof when affixed to a generic waste receptacle structure via a universal bolt pattern. The lid of the waste receptacle will have an opening through which waste can be deposited into the body of the receptacle. A standard bolt pattern comprising a plurality of through-apertures formed in the lid preferably along the periphery of the lid opening will be provided. The standard bolt pattern will enable the aforementioned system of customizable attachments, which include in-field configurable and installable hoods and guard plates, to meet the user's requirements for both precipitation protection and modifiable openings for waste discrimination.

The size of the cut-out opening in the lid, in congruence with the standard bolt pattern, enables the receptacle owner to modify the hood opening as well as the lid opening in a variety of ways in-field using prefabricated parts that do not require modification of the waste receptacle lid itself, accomplishing several tasks in the process. As a result, the user can add, change, or remove a rain hood at their desire using standard handheld tools and fasteners. In addition, the user can change both the opening in the lid or hood at their desire also using standard handheld tools and fasteners. The user can also add, or omit, whichever features they desire without having to purchase a new lid or waste receptacle, saving them time and cost.

Further areas of applicability of the present invention will become apparent from the detailed description provided hereinafter. It should be understood that the detailed description and specific examples, while indicating a preferred embodiment of the invention, are intended for purposes of illustration only and are not intended to limit the scope of the invention.

BRIEF DESCRIPTION OF THE DRAWINGS

The accompanying drawing figures, which are incorporated in and form a part of the specification, are illustrative of aspects of the present invention which will become more fully understood together with the following detailed description, and are not meant to limit the scope of the disclosure in any manner, which scope shall be based on the claims.

DESCRIPTION OF EXEMPLARY EMBODIMENT

Figure 1:
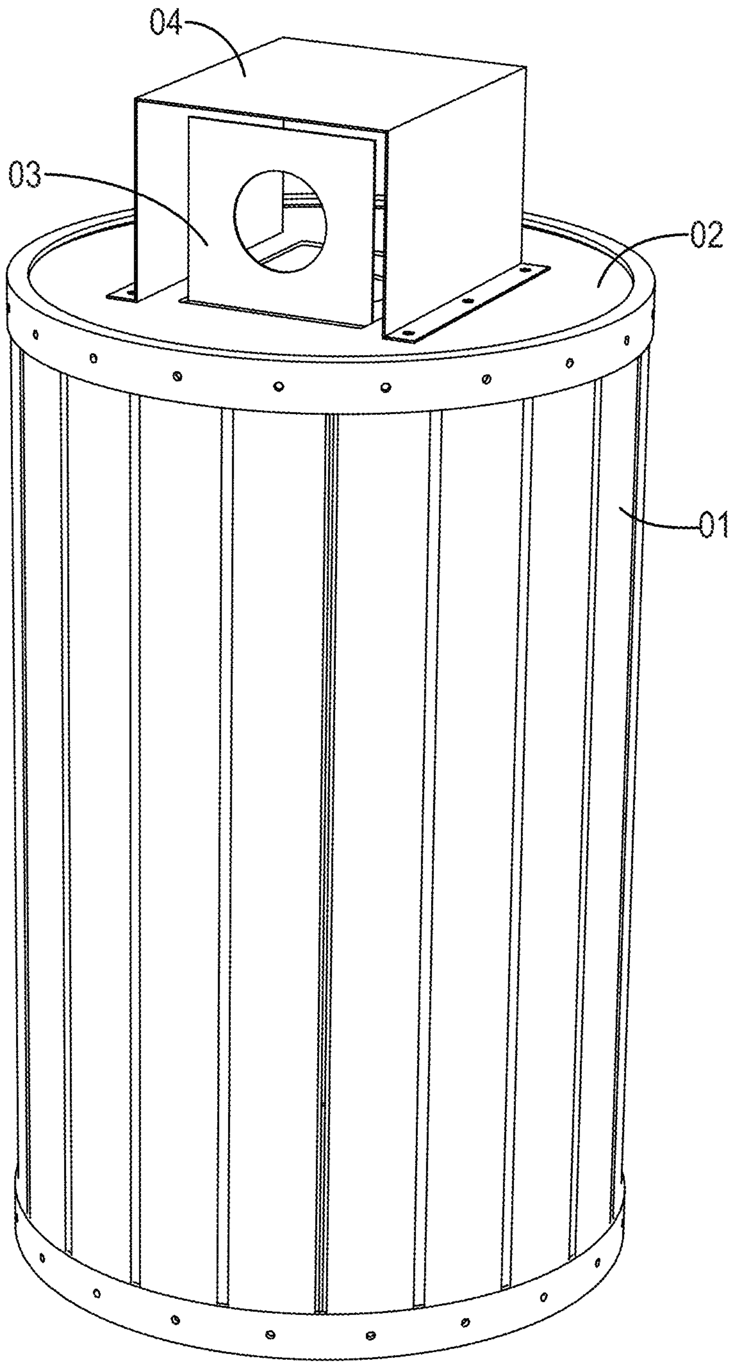
FIG. 1 is a perspective view of an embodiment of the configurable hood and guard plate assembly of the present invention installed on a generic waste receptacle.
Figure 2:
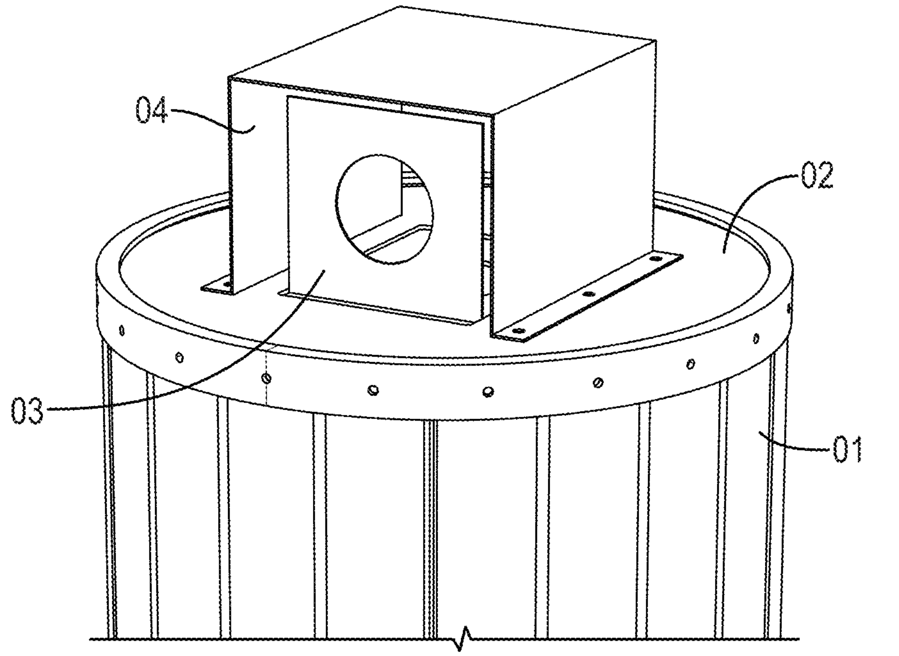
FIG. 2 is a close-up perspective view of the configurable hood and guard plate assembly shown in FIG. 1 and the circular opening in the hood guard plate for effectively restricting access to the main lid opening.

Reference will now be made in detail to embodiments of the present invention, examples of which are illustrated in the accompanying drawings. While the present invention will be described in conjunction with the several embodiment(s), the description is not intended to be understood in a limiting sense, but to be an example of the invention presented solely for illustration thereof, and by reference to which in connection with the following description and the accompanying drawings one skilled in the art may be advised of the advantages and benefits of the invention. On the contrary, the present invention is intended to cover alternatives, modifications, and equivalents, which may be included within the spirit and scope of the invention as defined by the appended claims. Further, it will be appreciated that embodiments of the present disclosure may employ any combination of features described herein. Descriptions of well-known starting materials, equipment, components, and processing techniques may be omitted so as to not unnecessarily obscure the embodiments herein.

Reference herein to a "first embodiment", "second embodiment", "an embodiment", "another embodiment" and like terms means that a particular feature, structure, or characteristic described in connection with the embodiment is included in at least one embodiment of the disclosure. The phrases "in an embodiment" or "in one embodiment" as used herein are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. Additionally, the words "herein," "above," "below," and words of similar import, when used in this document, shall refer to this document as a whole and not to any particular portions of this application. If the specification states a component or feature "may," "can," "could," or "might" be included or have a characteristic, that particular component or feature is not required to be included or have the characteristic.

As used herein, the singular forms "a," "an," and "the" include plural references unless the context clearly dictates otherwise. Unless defined otherwise, all technical and scientific terms used herein have the same meanings as commonly understood by one of ordinary skill in the art. When used in this document, the term "exemplary" is intended to mean "by way of example" and is not intended to indicate that a particular exemplary item is preferred or required. When terms such as "first" and "second" are used herein to modify a noun, such use is simply intended to distinguish one item from another, and is not intended to require a sequential order unless specifically stated.

With further reference to the drawings, a generic waste receptacle and waste receptacle lid are depicted incorporating an in-field customizable hood and guard plate assembly utilizing a standard or universal bolt pattern in accordance with the present invention. The generic waste receptacle can take different forms, provided that the lid, hood and guard plate assembly of the present invention have a bolt pattern design to fit the standard or universal bolt pattern on the lid.

Figure 3:
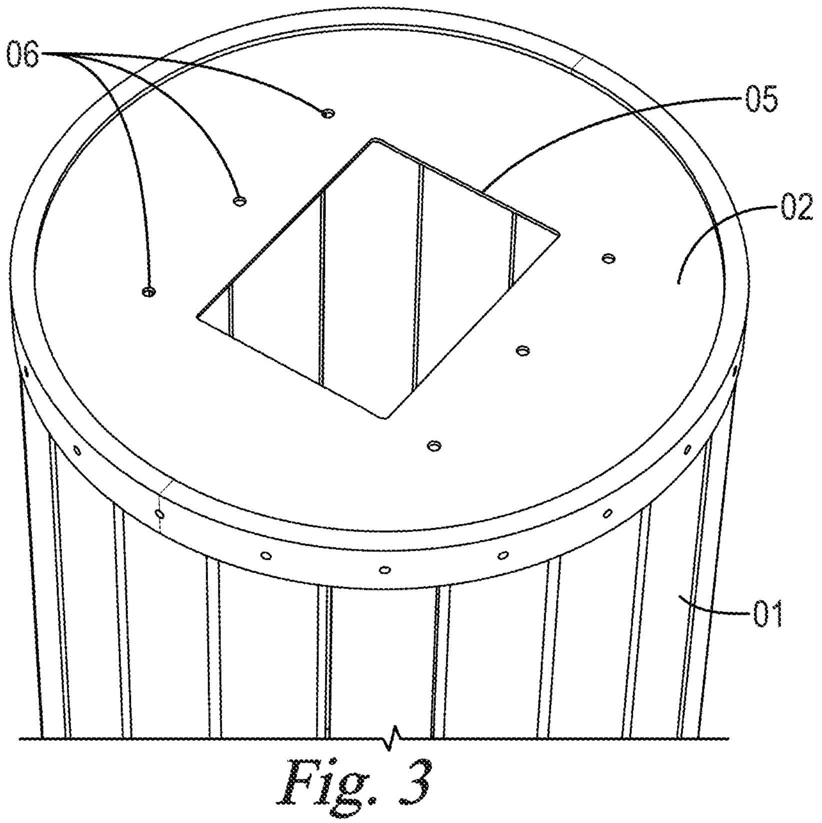
FIG. 3 is a top perspective view of the main lid cutout opening and standard bolt pattern in the waste receptacle lid facilitating the present invention.
Figure 6:
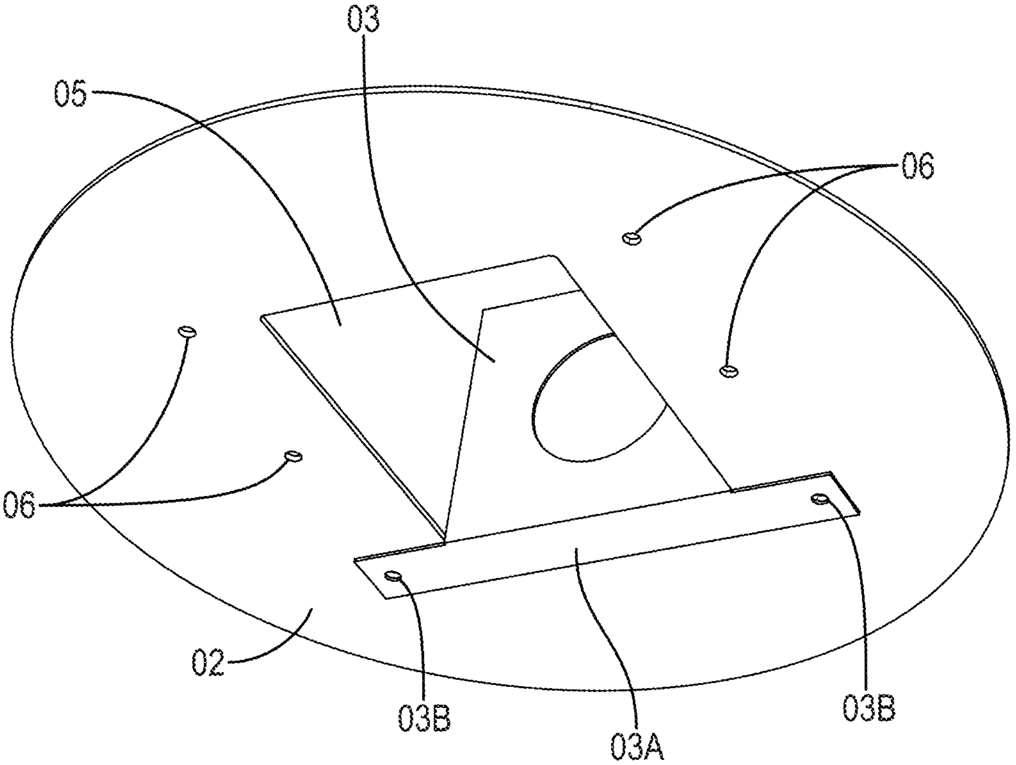
FIG. 6 is a bottom perspective view of the waste receptacle lid having a hood guard plate attached as in FIG. 5, illustrating the mating position of the hood guard plate attachment flange with the lid.

FIG. 1 illustrates a generic waste receptacle indicated generally by reference numeral 01 having a container structure or body for receiving waste. The body of waste receptacle 01 may be of a standard or non-standard size or shape having an open upper end and closed lower end, and in some embodiments may serve as an enclosure for another waste receiver such as a removable inner liner or container in which waste is accumulated. A flat or horizontally planar plate lid or cover indicated generally by reference numeral 02 is secured to the waste receptacle 01 in a position over the otherwise open upper end of the receptacle. Lid or cover 02 may be permanently fixed to the body of the waste receptacle 01 or may be detachably secured to the body by a suitable locking mechanism. Lid 02 has outer and inner side walls, and a cutout opening indicated generally by reference numeral 05 is formed in lid 02 through which waste can pass into the body of the waste receptacle 01 or into an inner receptacle or liner. As best shown in FIGS. 3 and 6, cutout opening 05 in the illustrated embodiment of lid 02 is centrally located on lid 02 and defined by a rim having pairs of longer length sides and shorter width sides forming the rectangular shape and is relatively large so the opening can be further modified or restricted by variably shaped and dimensions of the opening 03C in the guard plate. In one embodiment, cutout opening 05 may have a length of ten inches and a width of eight inches but it will be understood that cutout opening 05 may have other dimensions and other shapes such as round, triangular, hexagonal or the like while still falling within the intended scope of the invention.

Figure 4:
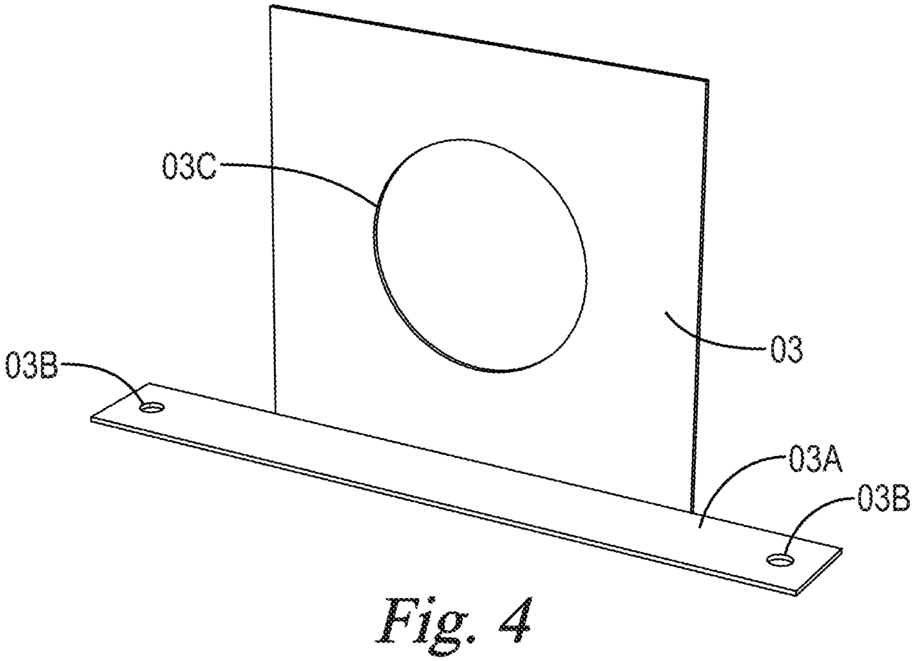
FIG. 4 is a perspective view of the hood guard plate shown in FIGS. 1 and 2 detached from the lid and showing a standard bolt pattern on the attachment flange.
Figure 5:
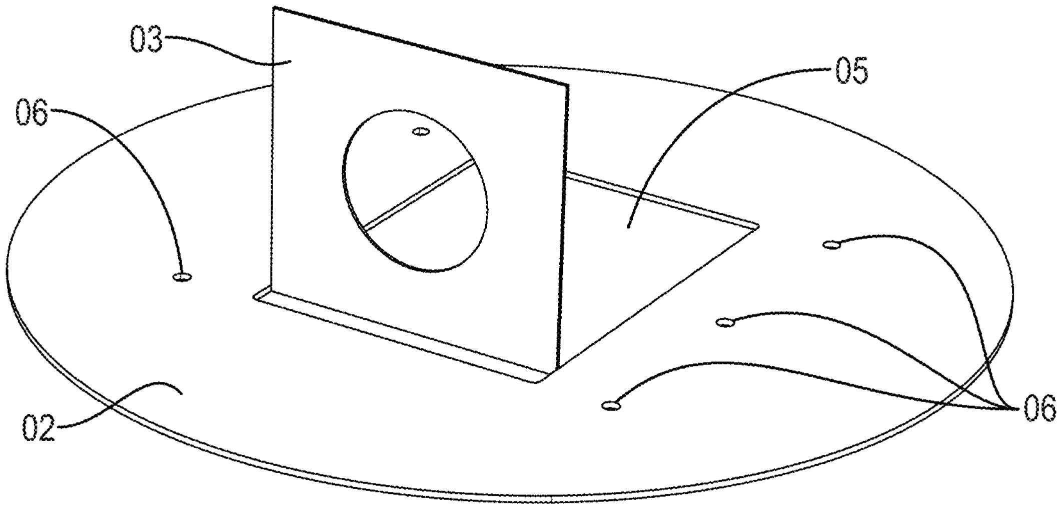
FIG. 5 is a top perspective view of the waste receptacle lid having a hood guard plate attached.

A first embodiment of an in-field hood and guard plate assembly in accordance with the present invention is also shown in FIGS. 1-7 and includes a hood guard plate, indicated generally by reference numeral 03, and a hood, indicated generally by reference numeral 04. In an embodiment the hood 04 and guard plate 03 are made of stainless steel, while in other embodiments may be formed of other materials or combinations of materials such as plastic, metal, and/or other materials. As shown in FIG. 4, guard plate 03 includes a main plate portion and an attachment flange indicated generally by reference numeral 03A. The main plate portion of guard plate 03 has an opening indicated generally by reference numeral 03C through which waste to be inserted into the waste receptacle 01 through cutout opening 05 in the lid 02 is initially passed. In the illustrated embodiment, the opening 03C in the main plate portion is circular in shape and is smaller than cutout opening 05 in the lid 02 so as to restrict access to cutout opening 05 and the types of waste which are placed in the waste receptacle 01. Connecting flange 03A extends at an angle from an end or edge of the main plate portion and in the present embodiment is at a right angle with respect to the main plate portion, while in other embodiments flange 03A may be at an acute or obtuse angle. In some embodiments connecting flange 03A may be integrally formed with the main plate portion while in other embodiments may be coupled to the main plate portion by welding, adhesive, or another suitable attachment means. Connecting flange 03A also includes a pair of spaced-apart through-holes indicated generally by reference numeral 03B formed near opposite ends of the flange. As illustrated in FIGS. 5 and 6, the hood guard plate 03 is secured to lid 02 with the main plate portion extending upwardly through cutout opening 05 in the lid 02 along a width side of the opening 05 and with the connecting flange 03A mated to the underside of the lid 02.

In the present embodiment, main plate portion of guard plate 03 has a rectangular shape, which shape mirrors the rectangular-shaped cutout opening 05 in the lid 02. The width of the main plate portion is slightly less than a width side of the rectangular cutout opening 05 in lid 02 so the main plate portion can be positioned extending upwardly through the cutout opening 05 along substantially the entire length of the width side. The connecting flange 03A of hood guard plate 03 has a length that is greater than the width of this side edge of the cutout opening 05 in lid 02. As described below, the in-field configurable hood guard plate 03 and hood 04 are each secured to lid 02 utilizing a standard or universal bolt pattern designed to fit with the lid 02.

Hood 04 includes a pair of opposite, upright side walls and a top wall which connects between outer ends of the upright side walls. Attachment or connecting flanges are coupled to the inner ends of each of the side walls, which flanges are angled and configured to be secured to lid 02 along opposite edges of the rectangular cutout opening 05, with an attachment surface flush against or in abutting contact with the lid. The side walls and upper wall of hood 04 as illustrated also has a rectangular shape. When the connecting flanges of hood 04 are coupled to lid 02, the side walls of hood 04 extend upwardly perpendicular to the top side of the lid 02, and the upper wall extends over the cutout opening 05, such that the hood 04 inhibits the ingress of precipitation through the lid opening 05 into the interior of the body of waste receptacle 02. When hood 04 is connected to lid 02, oppositely oriented rectangular-shaped side openings are formed between the inner surface of the side walls and upper wall of hood 04 and top side of the lid 02. Hood guard plate 03 is secured to the lid 02 in a position extending over one the side openings, and another similar guard plate 03 (not shown) will be secured to lid 02 extending over the opposite side opening. In some embodiments, the rectangular shapes of the opening in lid 02, guard plate 03, and hood 04 may be square, while in other embodiments hood 04 may have different shapes or configurations such as comprising a single curved hood extending between the connecting flanges. The main plate portion of hood guard plate 03 therefore will be shaped and dimensioned to correspond to the shape and dimensions of the side openings. In another embodiment, one of the opposite side openings may be enclosed by a rear wall such that access to the waste receptacle is only through a single side opening. The main plate section of the guard plate 03 effectively restricts access to the cutout opening 05 in the lid plate as compared to their initial, unobstructed proportions by substantially blocking the side openings under the hood 04. The types of refuse that are intended to be inserted into the waste receptacle 01 through the cutout opening 05 in the lid plate 02 is further controlled by the size and shape of the opening 03C in the main plate portion of hood guard plate 03.

As best shown in FIG. 3, cutout opening 05 in lid is bordered by a standard or universal bolt pattern indicated generally by reference numeral 06. Bolt pattern 06 in the illustrated embodiment includes a first row of equally spaced-apart mounting holes in the lid plate 02 along a length side of the cutout opening 05, and a second row of similarly equally spaced apart mounting holes in the lid plate 02 along the opposite length side of the cutout opening 05. The rows of mounting holes are aligned in parallel with opposite side edges of the rectangular cut-out opening 05, and in addition the individual mounting holes in each row are aligned with a mounting hole in the other row. In the exemplary embodiment, there are three mounting holes in each row, although in other embodiments there may be a greater or lesser number of mounting holes in one or both rows. At least one end hole in each row is positioned in lid 02 to correspond with the mounting holes 03B in the connecting flange 03A of the guard plate 03. The lid 02 will always have both its cutout opening 05 and bolt pattern 06 available to the end user for installing different hood and guard plate components having a bolt pattern designed to fit the waste receptacle 01.

The individual mounting holes of the standard bolt pattern 06 on lid 02 are sized to receive a fastener passed through the mounting holes, which fasteners are used to secure the configurable guard plate 03 and hood 04 to the lid plate 02. More specifically, the fastener may include, but is not limited to, a bolt having a threaded shank dimensioned to be inserted into the mounting hole, and a head provided integrally on an end of the shank. A nut may be coupled to the end portion of the shank opposite the head after being passed through the mounting hole.

FIGS. 5 and 6 illustrate the guard plate 03 attached to the lid 02. The guard plate 03 may be manufactured from plastic, metal, or any other suitable material or combination of materials to match the features of the waste receptacle. As indicated above, the guard plate 03 has a main plate portion and a connecting flange 03A with mounting holes 03B formed in the proximity of the opposite ends of the connecting flange. It will be evident in FIG. 6 that the mounting holes 03A have a bolt pattern which corresponds with the standard bolt pattern 06 in lid plate 02 to enable guard plate 03 to be coupled to lid plate 02 using the fasteners with the main plate portion extending upwardly through the cutout opening 02.

Figure 7:
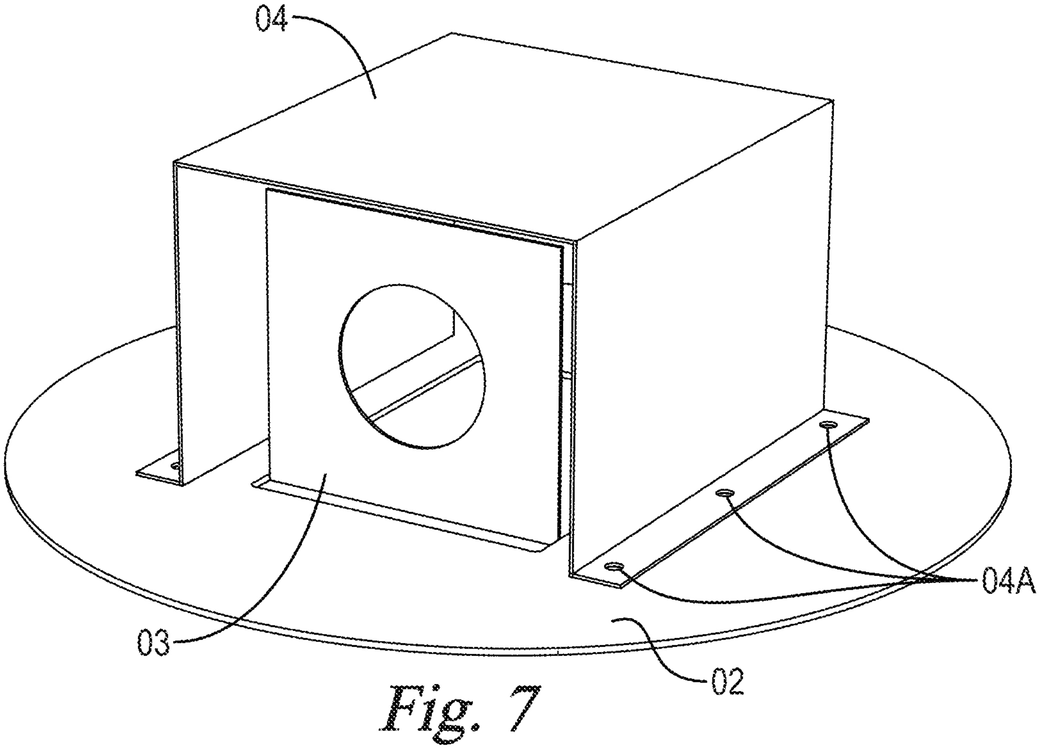
FIG. 7 is a top perspective view of the waste receptacle lid with the guard plate and hood assembly installed utilizing a standard bolt pattern.

In FIG. 5, the guard plate 03 is shown in a use position as it would be attached to the lid 02 by fasteners passed through aligned holes of the bolt pattern 03B in flange 03A and a pair of end mounting holes in each row of the standard bolt pattern 06 in lid 02. Flange 03A is perpendicular to the main plate portion of the guard plate 03 such that the main plate portion projects up through cutout opening 05 away from the top side of the lid plate 02. In FIG. 6 the underside of the lid plate 02 is visible and it can be seen that flange 03A extends under lid 02 with at least a portion of its top surface mated against the underside of lid plate 02. The inner side wall of the main plate portion of hood plate guard 03 may be in abutment with the width side of the cutout opening 05, but as shown in FIG. 7 this is not required. In this position, each of the mounting holes 03B in flange 03A will be in alignment with one of the mounting holes in each row of mounting holes in lid plate 02 on opposite sides of the lid opening 05 comprising the standard bolt pattern 06. This allows for a sturdy bolted connection between lid 02 and guard plate 03. When flange 03A is secured to lid plate 02 as shown, the main plate portion of guard plate 03 extends upwardly through cutout opening 05 in the lid plate 02 along a side edge of the opening. It will be evident that the present arrangement facilitates both the attachment and removal of the guard plate 03 to lid 02 in the field such that, for example, the guard plate 03 can be removed and replaced with another guard plate having a different size or shaped cutout opening in the field without required an entirely new waste receptacle or lid, guard plate, and hood assembly.

In FIG. 7, a completed configurable hood and guard plate assembly of the present invention is depicted. Guard plate 03 is installed to lid 02 as shown in FIGS. 5 and 6, with flange 03A secured to the underside of the lid plate 02, and with the main portion of the guard plate 03 projecting through the cutout opening 05. In addition, hood 04 is installed to lid 02 extending over top of cutout opening 05 in lid plate 02 and with the guard plate 03 obstructing access to the cutout opening 05 in lid plate 02 through one of the side openings between lid plate 02 and hood 04. The hood 04 has a pair of oppositely disposed flanges attached to a lower edge of the side panels which support the upper wall of the hood 04 in a position extending over the cutout opening 05 in lid 02. It will be evident in the drawings that the main plate portion of guard plate 03 has a width which is less than the distance between the side walls, and a height that is less than the height of the side walls, such that guard plate 03 is also positioned underneath the hood 04. It will also be evident that the larger rectangular cutout opening 05 in lid 02 can be effectively restricted to a smaller hole size by varying the size and shape of the cutout opening 03C in the guard plate 03 when attached to the lid 02 in combination with the hood 04.

Three equally spaced-apart mounting holes are formed in the connecting flanges of hood 04, in a bolt pattern indicated generally by numeral 04A that corresponds with and is designed to fit the aforementioned standard bolt pattern 06 in the lid plate 02. Hood 04 therefore is configured so that bolt pattern 04A on the flanges attached to the side walls of hood 04 can be aligned with one or more mounting holes in the standard bolt pattern 06 in lid plate 02. As a result, hood 04 is securable to the lid plate 02 by fasteners passed through the corresponding mounting holes in the flanges of hood 04 and lid 02. The guard plate 03 further restricts the size of any waste that can be inserted into the body of waste receptacle 01 through opening 05 in lid 02 without obstructing the external appearance of the hood 04. It will be understood that another guard plate 03, not shown, may be connected to lid 02 to restrict access to the cutout opening 05 in the lid 02 from the opposite side opening of the hood 04 in an identical manner, while in another embodiment the hood 04 may be constructed so that only a single side opening is formed, or there may be an access opening formed in only one of the guard plates. No additional bolts, screws, weldments, or glue are touching hood 04, such that the clean appearance of hood 04 is maintained.

Figure 8:
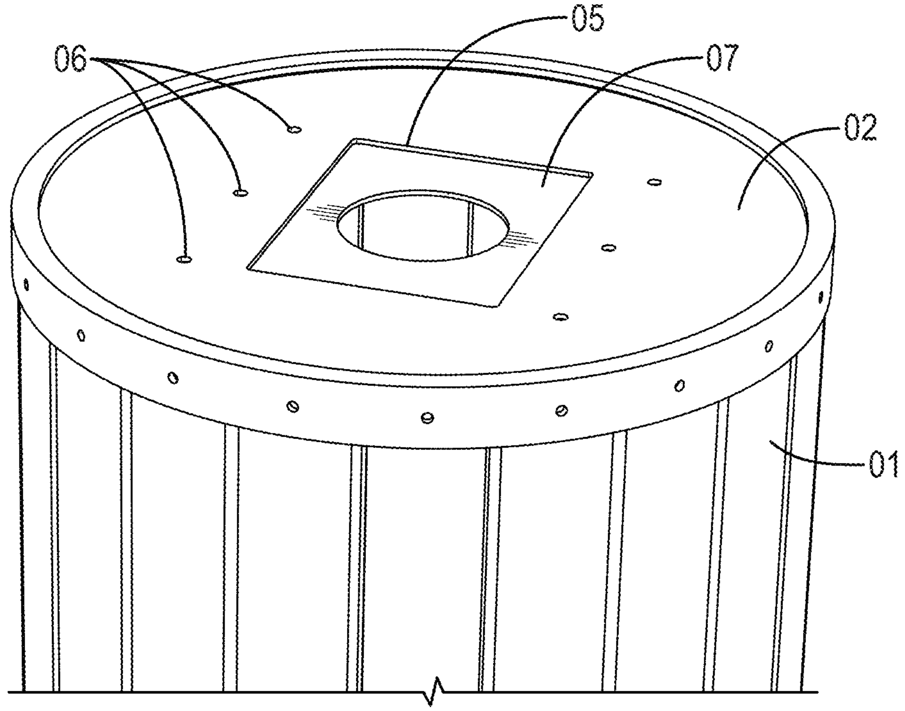
FIG. 8 is a top perspective view of another embodiment of the guard plate installed over the main opening in the lid having a bolt pattern designed to fit the standard bolt pattern and having a circular opening for restricting the main lid opening.

In FIG. 8, an alternative embodiment is shown which further illustrates the versatility of the present invention. Rather than securing a hood guard plate 03 in the side openings of the hood 04 which extends over the opening in lid 02, the cut-out opening 05 in lid plate 02 may be directly restricted instead, either with or without attachment of the hood 04. In this embodiment, a flat guard plate, indicated generally by reference numeral 07, having a circular opening which may be of a smaller dimension than rectangular cut-out opening 05 in lid plate 02, is directly secured to lid plate 02 extending over opening 05, illustrating how the present invention, including standard bolt pattern 06, can be applied to a multitude of arrangements desired by the receptacle owner.

Figure 9:
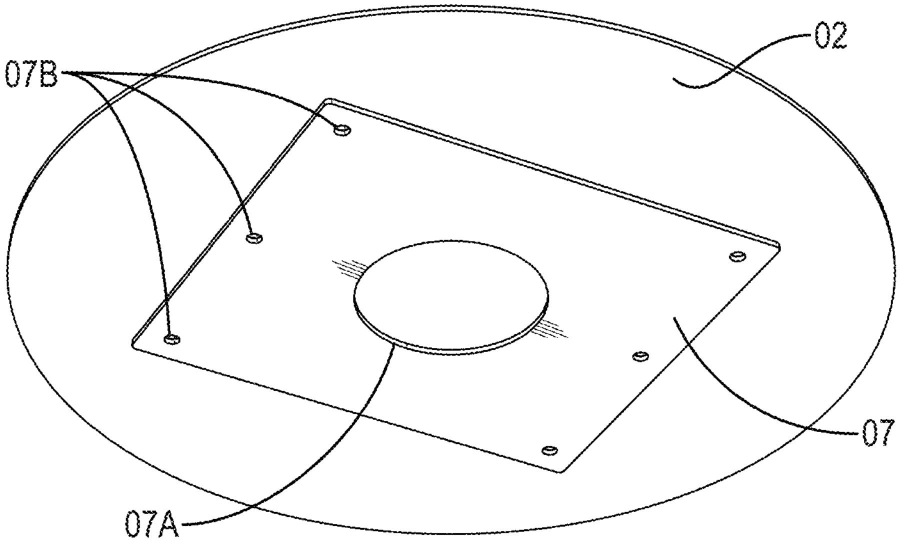
FIG. 9 is a bottom perspective view of the lid and guard plate shown in FIG. 8, illustrating the manner of attachment of the flat guard plate to the underside of the lid.

FIG. 9 illustrates the flat guard plate 07 and lid 02 described above with reference to FIG. 8 from the underside of lid 02. Flat guard plate 07 has a rectangular shape and is dimensioned to be larger than the rectangular cutout opening 05 in the lid 02. A bolt pattern comprising two rows each having three holes indicated generally by reference number 07B is also formed in flat guard plate 07. It will be evident that bolt pattern 07B is also designed to correspond to and fit with the bolt pattern 06 in lid plate 02. The hood and guard plate assembly can therefore be easily reconfigured to secure flat guard plate 07 to the underside of lid 02, while either removing any already installed components of the assembly, and then passing the bolt fasteners through the aligned holes in the bolt patterns 06 of lid 02 and 07B in guard plate 07. A circular cut-out in guard plate 07 is indicated generally by numeral 07A, such that the large, rectangular opening 05 in lid 02 is successfully reduced in size and shape by guard plate 07. Guard plate 07 may alternatively be secured on the top surface of lid 02 by the fasteners in a similar manner. A hood 04 may also be secured extending over the lid 02 and guard plate 07 as described above to prevent precipitation from entering the waste receptacle though circular cutout 07A. This arrangement may be particularly useful is a hood is not desired either temporarily or permanently, or if a guard plate 03 covering the side openings in the hood 04 is not desired or available. The flat guard plate 07 can also be used in combination with the hood guard plate 03 if desired. For example, the flat guard plate 07 may include other features such as a peripheral lip which further prevents ingress of precipitation into the waste receptacle 01, in addition to the hood 04.

Figure 10:
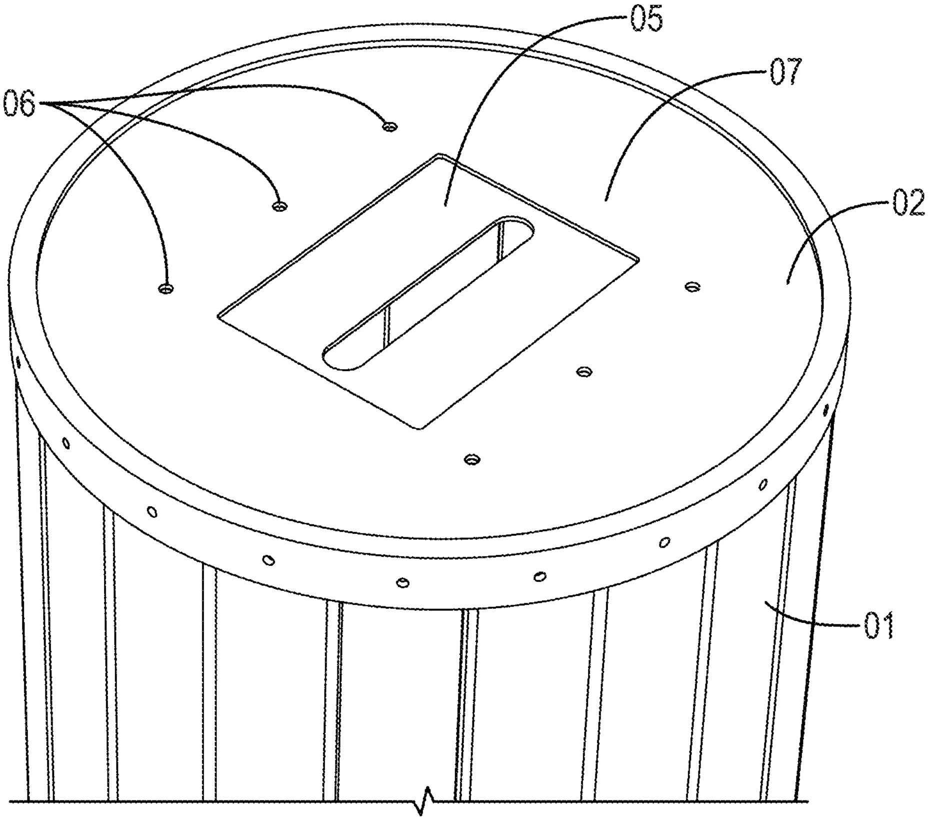
FIG. 10 is a top perspective view of another embodiment of the guard plate installed over the main opening in the lid using the standard bolt pattern and having a slot-shaped opening.

FIG. 10 illustrates another alternative version of a flat guard plate 07, which is identical to the flat guard plate shown in FIGS. 8 and 9 except having a narrow slot-shaped opening rather than a circular opening, which may be desirable if waste receptacle 01 is to be repurposed to collect, for example, paper, magazines and the like, rather than plastics. Due to the standard bolt pattern 06 in lid plate 02 and corresponding bolt pattern 07B in flat guard plate 07, rather than requiring a completely new waste receptacle or lid structure, the flat guard plate 07 can be quickly changed out in the field.

Figure 11:
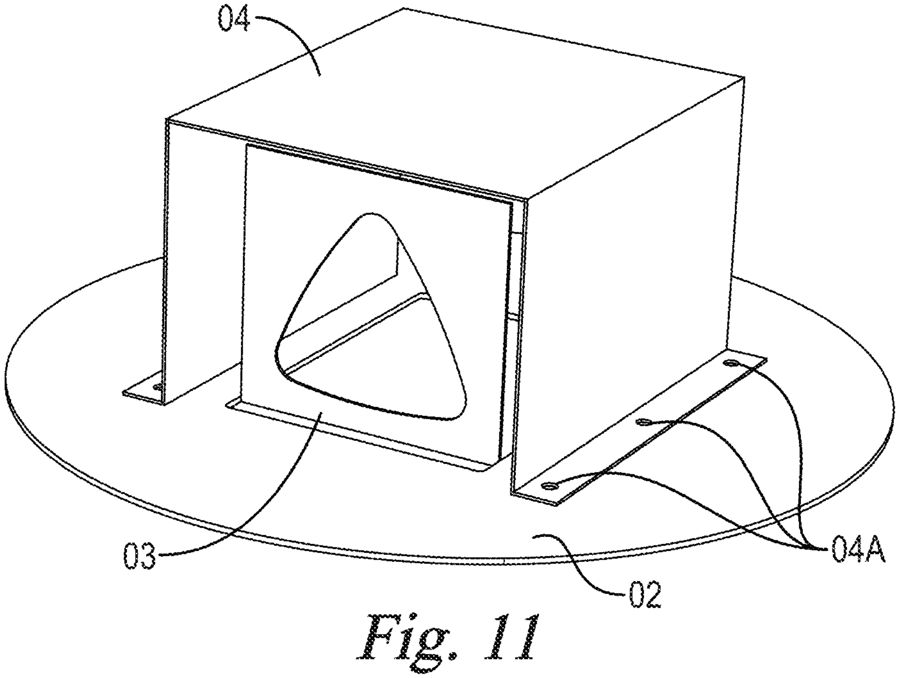
FIG. 11 a top perspective view of the waste receptacle lid with another embodiment of the hood and guard plate assembly installed with the guard plate having a triangular shaped opening.

FIG. 11 illustrates another alternate embodiment of the hood and guard plate assembly, which is identical to the assembly shown in FIG. 7, except the guard plate 03 has a somewhat larger triangular shaped opening rather than a circular opening as in FIG. 7. It will be evident that vertical guard plate 03 can be quickly and easily switched out for a different vertical guard plate in the field having a different opening configuration so as to repurpose the waste receptacle without removing the hood 04 except for loosening the bolts passed through any apertures shared by both the hood 04 and vertical guard plate 03.

It will be understood that other prefabricated guard plate and hood components may be provided and secured to the lid 02 if provided with a bolt pattern that is design to correspond to or fit with the standard bolt pattern. In other embodiments, flat guard plate 07 may have a square, rectangular, or slot-shaped cutout. In still other embodiments, the guard plate 07 may be used in combination with a rain hood 04 having a specialized ornamental design as long as the hood does not hinder manual access to the cutout opening. A portion or portions of the guard plate 07 may also extend upwardly through the opening 05 in lid 02. The main plate portion of the hood guard plate 03 and lid guard plate 07 also do not have to be flat and may otherwise angled or curved to suit particular consumer needs. The hood plate could also be secured to an upper surface of the lid 02.

As indicated above, hood 04 inhibits the ingress of precipitation through the lid opening, while guard plate 03 restricts the types of refuse that can be inserted into the waste receptacle through the cutout opening 05 in the lid plate 02. In other embodiments, the upper wall of hood 04 may still be flat but may be slanted and may be mono-pitched or split into two or more angled panels, which will inhibit precipitation from accumulating on the upper wall of the hood 04. In still other embodiments, the hood 04 may be curved such as having a convex curve or may have other shapes. In addition, it will be understood that guard plate 03 can be shaped to generally correspond to the shape of the side opening formed between the hood 04 and top side of the lid 02. In some embodiments, the guard plate 03 and hood 04 assembly may be provided as a single combined assembly. The assembly may also be configured for use with non-flat or standard horizontally planar lids as long as a central opening and standard selected bolt pattern are provided in the lid.

The foregoing description has been presented for purposes of illustration and description and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

What is claimed is:

1. A configurable waste receptacle hood and guard plate attachment assembly comprising:

a hood configured to be secured to a waste receptacle lid in a position extending over a cutout opening in the lid, the hood having an upper wall, an attachment flange connected to an inner end of the hood configured to be coupled to the lid, and one or more apertures in the attachment flange arranged in a selected bolt pattern designed to correspond to a standard bolt pattern on the lid to facilitate securing the hood to the lid; and a guard plate having a main plate portion configured to be positioned in a side opening underneath the hood, a cutout opening in the main plate portion having lesser dimensions that the cutout opening in the lid, and a connecting flange attached to the main plate portion at an angle, said connecting flange having a plurality of mounting holes designed to fit the standard bolt pattern formed in the waste receptacle lid to allow the guard plate to be mounted to the lid;

wherein the guard plate restricts access to the side opening formed between the lid and the hood, and to the cutout opening in the lid plate.

2. The configurable waste receptacle hood and guard plate attachment assembly of claim 1 wherein the connecting flange of the guard plate is secured to an underside of the waste receptacle lid with the main plate portion extending through the cutout opening in the lid.

3. The configurable waste receptacle hood and guard plate attachment assembly of claim 2 further comprising another attachment flange connected to an opposite inner end of the hood having the standard bolt pattern formed in the attachment flange.

4. The configurable waste receptacle hood and guard plate attachment assembly of claim 3 wherein the hood further comprises a pair of opposite upright side walls, and the attachment flanges are connected to inner ends of the side walls.

5. The configurable waste receptacle hood and guard plate attachment assembly of claim 4 wherein the guard plate is positioned underneath the hood.

6. The configurable waste receptacle hood and guard plate attachment assembly of claim 5 additionally comprising a flat guard plate configured to be secured over the cutout opening in the waste receptacle lid having at least two mounting apertures which are in alignment with the standard bolt pattern.

7. The configurable waste receptacle hood and guard plate attachment assembly of claim 6 further comprising a plurality of hoods and guard plates in a range of different configurations having a bolt pattern designed to fit the standard bolt pattern of the waste receptacle lid to allow said hood and guard plates to be mounted to the lid.

8. A configurable waste receptacle hood and guard plate assembly comprising:

a waste receptacle lid configured to be secured to a waste receptacle, the lid having outer and inner side walls, a cutout opening in the lid configured to allow waste to be passed therethrough into an interior of the waste receptacle, and a plurality of mounting holes formed in the waste receptacle lid, said mounting holes adapted to couple at least one of a hood and one or more guard plates to the lid and being arranged on the lid in a spaced apart relation and according to a selected bolt pattern, said hood and one or more guard plates each including at least one connecting flange having a surface configured to be positioned flush against the lid, and one or more apertures in the connecting flange arranged to correspond with the selected bolt pattern in the lid to facilitate securing the connecting flange to the lid.

9. The configurable hood and guard plate assembly of claim 8 wherein one of the guard plates is configured to be positioned extending directly over the cutout opening in the lid to restrict access to interior of the waste receptacle through the cutout opening in the lid.

10. The configurable hood and guard plate assembly of claim 8 wherein the hood further comprises a wall configured to extend over the cutout opening in the waste receptacle lid, one of said connecting flanges is attached to an end of the wall, and another of said connecting flanges is attached to another end of the wall.

11. The configurable hood and guard plate assembly of claim 10 wherein the one or more guard plates further comprises a main plate portion configured to be positioned in a side opening formed between the lid and the hood, and a cutout opening in the main plate portion having smaller dimensions than the cutout opening in the lid to restrict access to the interior of the waste receptacle through the side opening and cutout opening in the lid.

12. The configurable hood and guard plate assembly of claim 11 wherein the at least one connecting flange of the guard plate is attached to the main plate portion at an angle and the surface configured to be positioned flush against the waste receptacle lid is mated against the inner side wall of the lid.

13. The configurable hood and guard plate assembly of claim 12 wherein the main plate portion of the guard plate extends upwardly through the cutout opening in the waste receptacle lid.

14. The configurable hood and guard plate assembly of claim 13 wherein the connecting flanges of the hood are secured to the outer side wall of the lid.

15. The configurable hood and guard plate assembly of claim 14 wherein the main plate portion of the guard plate is positioned underneath the hood wall.

16. The configurable waste receptacle hood and guard plate assembly of claim 15 wherein the main plate section of the guard plate is perpendicular to the at least one connecting flange of the guard plate.

17. The configurable hood and guard plate assembly of claim 10 wherein the hood wall additionally comprises a pair of opposite side walls joined by a top wall which extends over the cutout opening in the waste receptacle lid.

18. The configurable hood and guard plate assembly of claim 8 wherein the cutout opening in the waste receptacle lid has a rectangular shape and the standard bolt pattern in the lid includes first and second rows of mounting holes aligned in parallel along opposite sides of the cutout opening in the waste receptacle lid.

19. The configurable hood and guard plate assembly of claim 8 wherein the cutout opening in the one or more guard plates has a circular shape.

20. The configurable hood and guard plate assembly of claim 8 wherein the cutout opening in the one or more guard plates has a triangular shape.

21. The configurable hood and guard plate assembly of claim 8 wherein the guard plate is removable from the waste receptacle lid and can be replaced with another guard plate having a different shaped cutout opening for repurposing the waste receptacle without requiring removal of the hood.

22. The configurable guard plate and hood assembly of claim 8 further comprising a flat guard plate having a differently shaped cutout opening than the cutout opening in the waste receptacle lid, and a plurality of holes in the flat guard plate arranged in a bolt pattern designed to correspond to one of the mounting holes in the standard bolt pattern in the lid to facilitate securing the flat guard plate to the inner side wall of the lid with the differently shaped cutout opening in the flat guard plate extending over the cutout opening in the lid.

* * * * *